W. W. LYMAN.
Domestic Boiler.

No. 102,951.            Patented May 10, 1870.

Witnesses

Inventor
William W. Lyman.
By his Attorney
John E. Earle

United States Patent Office.

WILLIAM W. LYMAN, OF MERIDEN, CONNECTICUT.

Letters Patent No. 102,951, dated May 10, 1870.

IMPROVEMENT IN APPARATUS FOR PRESERVING FRUIT.

The Schedule referred to in these Letters Patent and making part of the same.

*To all whom it may concern:*

Be it known that I, WILLIAM W. LYMAN, of Meriden, in the county of New Haven and State of Connecticut, have invented a new Improvement in Apparatus for Cooking Fruit; and I do hereby declare the following, when taken in connection with the accompanying drawings and the letters of reference marked thereon, to be a full, clear, and exact description of the same, and which said drawings constitute part of this specification, and represent in—

Figure 1:
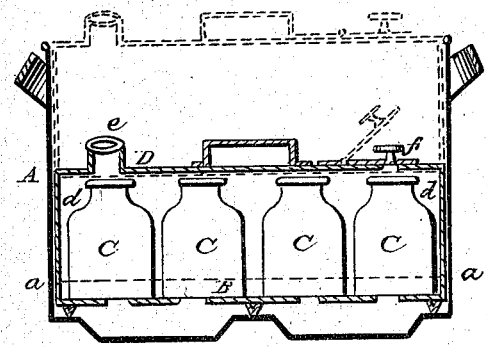
Figure 2:
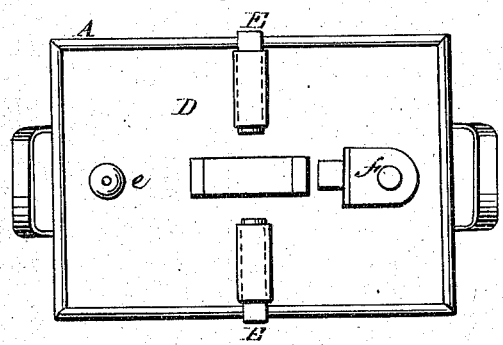

Figure 1, a vertical central section, and in
Figure 2, a top view.

This invention relates to an improvement in apparatus for cooking fruit, or preparing it after it has been placed in cans to be closed for preservation.

This process is usually and best performed by steaming, and, while it is essential that the fruit be cooked, it must not be overdone; hence, it is desirable to time the cooking, and this I accomplish by my apparatus, which is also applicable to other purposes; and consists in the arrangement of a cover within a boiler so as to set down over the can placed therein.

The cover is formed with an edge, so as to set down into the water and form a packing, and provided with a safety-valve for the escape of the steam, and also with an alarm, so that the boiling-point will be denoted by the steam-sounding alarm, from which the time may be denoted.

A is a boiler, of any common or known construction, within which I arrange a perforated plate, B, upon which several cans, C, are set, and the boiler filled with water to about the line $a\ a$.

D is a cover or plate fitting closely into the boiler, and yet so as to be easily raised or lowered therein, and provided with an edge projecting downward, so as to extend into the water, as denoted in fig. 1, inclosing the cans in a chamber formed within the boiler by the plate D.

The said plate is provided with a safety-valve, $f$, and with a whistle or other alarm, $e$.

The fruit having been placed in the cans, the cans are set into the boiler and covered, then set over the fire, and left until the water boils, the time of boiling denoted by the escape steam sounding the alarm $e$. Thus, the time being noted, the fruit is then left until the water has boiled a given length of time.

This process is found to cook the fruit in the most successful manner; the constant presence of hot steam entirely around the cans, cut off from the atmosphere, insures the successful cooking.

For other steaming purposes, the plate B may be raised to any desirable point, and the cover D lifted and secured at the upper edge of the boiler by the sliding bars E, or other suitable device for holding it in that elevated position. This forms a convenient steamer for bread, cakes, &c.

I claim as my invention—

1. The arrangement in a steaming-apparatus of the cover D with its edge $d$, constructed so as to extend into the water and form a packing, combined with an alarm, $e$, to sound the time of boiling, substantially as set forth.

2. In combination with the foregoing, the perforated plate B, as and for the purpose specified.

3. In combination with the foregoing, the supports E, substantially as described, to support the cover in an elevated position, substantially as and for the purpose set forth.

WILLIAM W. LYMAN.

Witnesses:
ORVILLE H. PLATT,
M. L. DELAVAN.